April 29, 1930. C. R. SHORT 1,756,915
INERTIA FORCE BALANCER WITH SINGLE ECCENTRIC WEIGHT
Filed March 1, 1926 2 Sheets-Sheet 1

Inventor
Charles R. Short
By Blackmore, Spencer & Fluit
Attorneys

April 29, 1930. C. R. SHORT 1,756,915
INERTIA FORCE BALANCER WITH SINGLE ECCENTRIC WEIGHT
Filed March 1, 1926 2 Sheets-Sheet 2
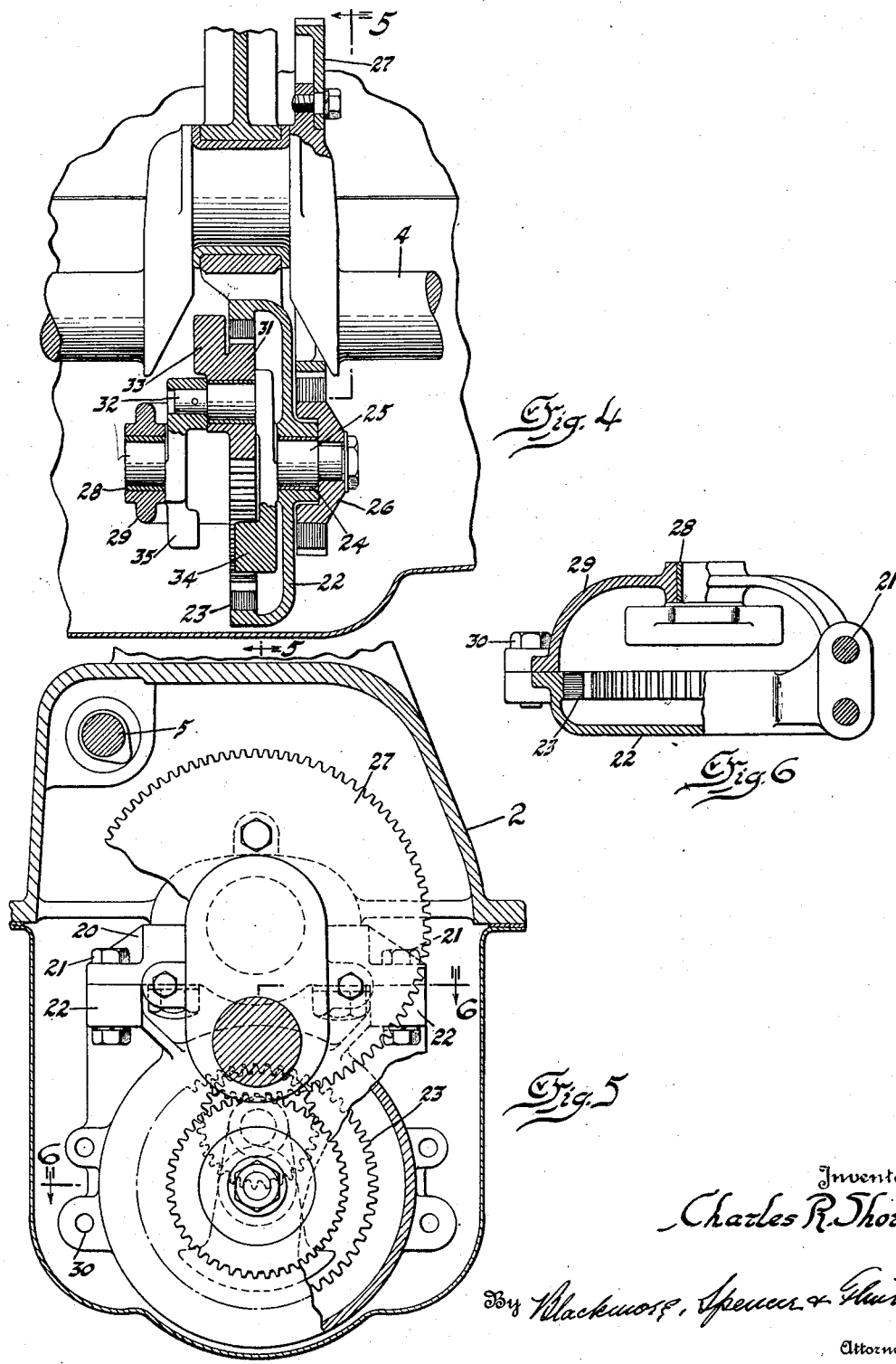

Patented Apr. 29, 1930

1,756,915

UNITED STATES PATENT OFFICE

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE

INERTIA-FORCE BALANCER WITH SINGLE ECCENTRIC WEIGHT

Application filed March 1, 1926. Serial No. 91,504.

The invention relates to motors or the like wherein reciprocating pistons rotate a crank shaft by means of connecting rods.

In such motors secondary inertia vibrations occur which are particularly objectionable in four cylinder engines, and where the cranks are positioned at 180° to each other. These are transverse vibrations and are caused by the lack of uniform piston displacement, the latter being dependent, among other factors, upon the length of the connecting rod, the radius of the crank and the weight of reciprocating parts.

To overcome such vibrations, it has been proposed to employ oppositely rotating bob weights having twice the periodicity of the crank shaft. It has also been proposed to eliminate such vibrations by reciprocating members.

It is an object of this invention to neutralize this vibration by a single reciprocating weight driven by gearing from the crank shaft in such a way as to have two complete reciprocations at each complete crank shaft rotation, and to do this by a gear train including a fixed internal gear engaged by a pinion rotating at four times the crank shaft speed, the pinion carrying the reciprocating weight.

For a full understanding of the invention, the following specification and the accompanying drawing are referred to.

In the drawing:

Figure 4 is a longitudinal vertical section through the crank case showing a second embodiment of the invention.

Figure 5 is a transverse sectional view on line 5—5 Figure 4.

Figure 6 is a sectional view on line 6—6 Figure 5.

Figure 1:
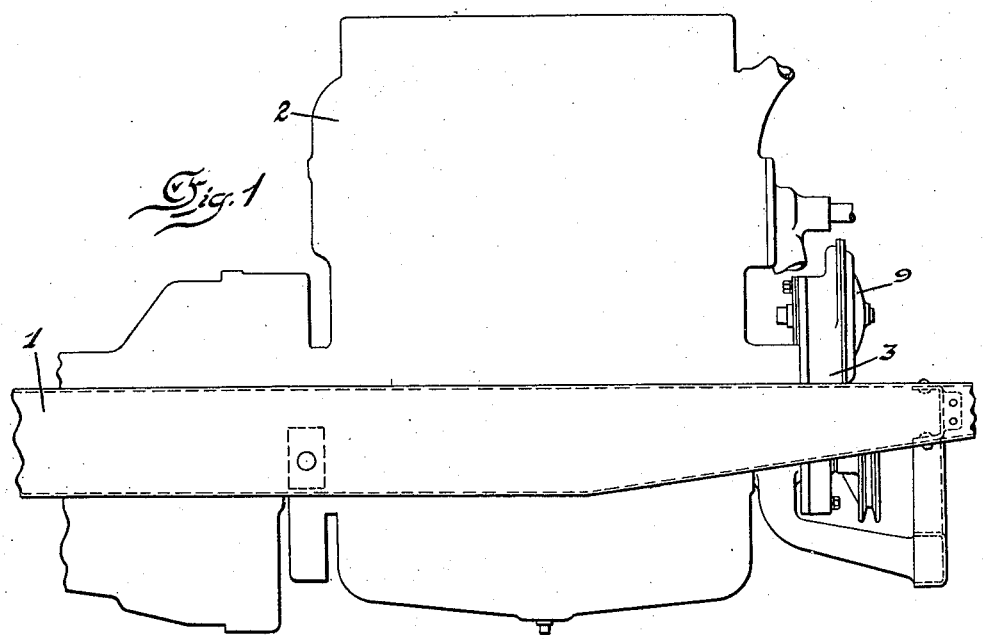
Figure 1 is a side view of a motor equipped with the invention.
Figure 2:
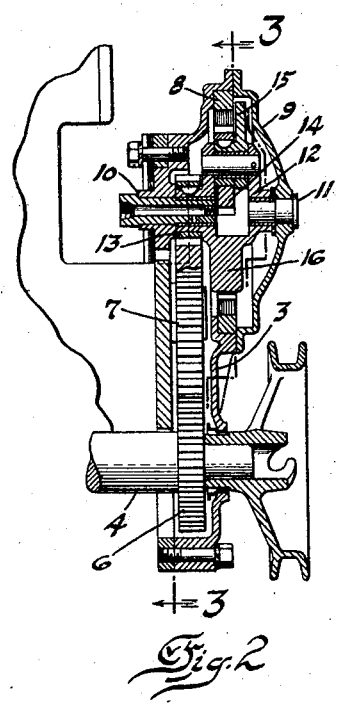
Figure 2 is a longitudinal transverse section through the timing gears and balancing arrangement.
Figure 3:
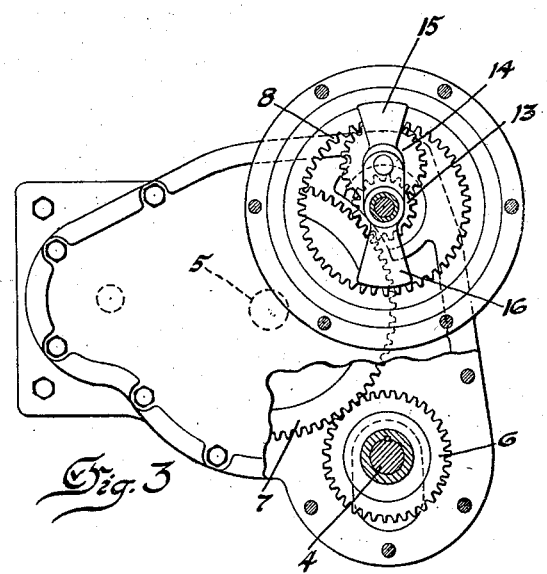
Figure 3 is a front elevation on line 3—3 Figure 2, partly broken away to show the gearing.

Referring by reference characters to the drawing, and first to Figures 1 to 3, inclusive, numeral 1 represents the frame of a motor vehicle supporting, in any suitable way, a motor 2. At its front end the motor has a special timing gear casing 3. Into this casing extends the crank shaft 4 and the cam shaft 5 having the usual gears 6 and 7. The casing is also equipped with an internal gear 8. A cover 9 is secured to the casing 3 and journalled as at 10 in the casing and at 11 in the cover is a small single throw crank shaft 12. This crank shaft is rotated by a gear 13 driven by the cam shaft gear 7. The gears 7 and 13 have a four to one (4 to 1) ratio. On the crank pin of shaft 12 is a small gear 14 meshing with the internal gear 8. There is a two to one (2 to 1) ratio between the gears 8 and 14. At about its pitch line the gear 14 carries a weight 15 attached thereto or integral therewith. The counter weight 16 on the crank shaft counterbalances the weight of the throw and the gear.

It will be seen that due to the gear ratios the small crank shaft rotates at twice the speed of the engine crank shaft, and that the engagement of the small gear and the internal gear results in two complete reciprocations in the weight for each complete rotation of the engine crank shaft.

A second form of the invention is shown in Figures 4 to 6 inclusive. In these figures is shown, in place of the usual center bearing cap, a special casting 20. To this casting is secured, by bolts 21, a housing 22, the latter containing an internal gear 23. Journalled in the housing at 24 is a small crank shaft 25 having a single throw. On the outer end of this crank shaft 25 is a gear 26 driven by gear 27 on the engine crank shaft. The ratio of gears 27 and 26 is two to one (2 to 1). The small crank shaft has its second bearing at 28 in a V shaped support 29 bolted to the housing 22 at 30. A small gear 31 engages the internal gear 23 and is rotatably mounted on the crank throw 32. The ratio of the gears 31 and 23 is two to one (2 to 1). Attached to, or integral with, the gear 31, at its pitch line, is a weight 33, the weight rotating with the gear. Counter weights 34 and 35 counterbalance the weights of the throw and gear. In this form of the invention, as in that first described, as the small crank shaft is rotated, the small gear rolls in the internal gear, which is twice as large as the small gear, and is caused to rotate two revolutions for one revolution of the small crank shaft. As the gear reduction between the gear of the engine crank shaft and the gear on the small crank shaft is two to one (2 to 1), the small gear will rotate four times for one revolution of the main crank shaft. For each revolution of the small crank shaft, the weight moves along a vertical line, down and up, being at top dead center together with the top position of the crank pin, and at bottom dead center together with the bottom position of the crank pin. Since the small crank shaft revolves twice during one revolution of the main crank shaft, the weight will move over its path, down and up again from top position to top position twice during one revolution of the main crank shaft.

In the form of the invention shown in Figures 1 to 3, the motor is assumed to be hinged, at its rear support, the inertia forces are considered as acting in the plane of the center line of the crank bearing and the balance weight is calculated as inversely proportional to the distance from the rear support. In the form shown by Figures 4 to 6, the secondary forces are considered as acting in the plane of the center line of the center bearing and the balance weight acting in that plane, is directly proportional to the secondary forces.

It may be demonstrated that the acceleration of the weight is that of a body describing a simple harmonic vibration, and that the acceleration, due to the secondary forces, is also a harmonic acceleration. Wherefore, the weight, by its reciprocating movements, counteracts the secondary inertia forces of the motor.

I claim:

Means to balance the secondary inertia forces of a motor having a crank shaft, comprising a timing gear casing, timing gears therein, a small crank shaft journalled in the said casing, an eccentrically weighted pinion on the crank pin of said small crank shaft, a fixed internal gear carried by the casing and engaged by the pinion, a gear on the small crank shaft in mesh with one of the timing gears, the proportions being such as to provide two complete reciprocating movements of said weight for a single rotation of the engine crank shaft.

In testimony whereof I affix my signature.

CHARLES R. SHORT.